United States Patent
Phuyal et al.

(10) Patent No.: US 11,653,269 B2
(45) Date of Patent: May 16, 2023

(54) RECOMMENDED BIT RATE AND RECOMMENDED BIT RATE QUERY FOR UPLINK AND DOWNLINK STREAMING

(71) Applicant: QUALCOMM Incorporated, San Diego, CA (US)

(72) Inventors: Umesh Phuyal, San Diego, CA (US); Charles Nung Lo, San Diego, CA (US); Linhai He, San Diego, CA (US); Min Wang, San Diego, CA (US); Prasad Reddy Kadiri, San Diego, CA (US); Sitaramanjaneyulu Kanamarlapudi, San Diego, CA (US); Nikolai Konrad Leung, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/986,230

(22) Filed: Aug. 5, 2020

(65) Prior Publication Data
US 2021/0045015 A1 Feb. 11, 2021

Related U.S. Application Data

(60) Provisional application No. 62/910,264, filed on Oct. 3, 2019, provisional application No. 62/883,612, filed on Aug. 6, 2019.

(51) Int. Cl.
*H04W 28/22* (2009.01)
*H04W 48/14* (2009.01)
(Continued)

(52) U.S. Cl.
CPC ....... *H04W 28/22* (2013.01); *H04W 28/0252* (2013.01); *H04W 48/14* (2013.01); *H04W 76/27* (2018.02); *H04W 80/02* (2013.01)

(58) Field of Classification Search
CPC . H04W 28/22; H04W 76/27; H04W 28/0252; H04W 48/14; H04W 80/02
(Continued)

(56) References Cited

U.S. PATENT DOCUMENTS

| 8,130,709 B2 * | 3/2012 | Kim | H04L 47/2458 |
| | | | 370/329 |
| 9,001,735 B2 * | 4/2015 | Padovani | H04L 1/0002 |
| | | | 370/328 |

(Continued)

FOREIGN PATENT DOCUMENTS

EP   3456088 A1   3/2019

OTHER PUBLICATIONS

Ericsson L.M., et al., "E-FLUS Updates", 3GPP Draft, 26939 CR0002R1 (REL-16), 3GPP TSG-SA WG4 Meeting #103, S4-190557, 3rd Generation Partnership Project (3GPP), Mobile Competence Centre, 650, Route Des Lucioles, F-06921 Sophia-Antipolis Cedex, France, vol. RAN WG4, No. Newport, Beach, CA, USA, Apr. 8, 2019-Apr. 12, 2019, May 24, 2019 (May 24, 2019), XP051748581, 45 pages, Retrieved from the Internet: URL: http://www.3gpp.org/ftp/Meetings%5F3GPP%5FSYNC/SA/Docs/SP%2D190341%2Ezip.

(Continued)

*Primary Examiner* — Nghi H Ly
(74) *Attorney, Agent, or Firm* — Qualcomm Incorporated

(57) ABSTRACT

Certain aspects of the present disclosure provide techniques for an enhanced query and response message for a recommended bit rate for uplink and/or downlink streaming. The techniques generally include generating a query message indicating a requested data rate for streaming services, wherein the requested data rate is indicated via a bit rate field and one or more additional bits, and sending the query message to a base station.

31 Claims, 15 Drawing Sheets

(51) Int. Cl.
  *H04W 28/02* (2009.01)
  *H04W 76/27* (2018.01)
  *H04W 80/02* (2009.01)
(58) Field of Classification Search
  USPC .......... 370/329, 328, 338, 341, 345, 350
  See application file for complete search history.

(56) References Cited

U.S. PATENT DOCUMENTS

| | | | |
|---|---|---|---|
| 9,913,187 | B1 | 3/2018 | Pawar et al. |
| 2014/0215051 | A1* | 7/2014 | Schlack .............. H04L 67/1008 709/224 |
| 2018/0324501 | A1* | 11/2018 | Kim ................. H04N 21/64738 |

OTHER PUBLICATIONS

Ericsson: "RAN Assisted Codec Rate Selection and Adaptation", 3GPP Draft, 3GPP TSG-RAN WG2 #95bis, R2-167082—RAN Assisted Codec Rate Selection and Adaptation, 3rd Generation Partnership Project (3GPP), Mobile Competence Centre, 650, Route Des Lucioles, F-06921 Sophia-Antipolis Cedex, France, vol. RAN WG2, No. Kaohsiung, Taiwan, Oct. 10, 2016-Oct. 14, 2016, Oct. 9, 2016 (Oct. 9, 2016), XP051151484, 6 pages, Retrieved from the Internet: URL: http://www.3gpp.org/ftp/Meetings_3GPP_SYNC/RAN2/Docs/.

International Search Report and Written Opinion—PCT/US2020/045207—ISA/EPO—dated Oct. 12, 2020.

Qualcomm Incorporated: "Recommended Bit Rate/Query for FLUS and MTSI", 3GPP Draft, 3GPP TSG-RAN2 Meeting #109-e, R2-2000438, 3rd Generation Partnership Project (3GPP), Mobile Competence Centre, 650, Route Des Lucioles, F-06921 Sophia-Antipolis Cedex, France, vol. RAN WG2, No. Online, Feb. 24, 2020-Mar. 6, 2020, Feb. 14, 2020 (Feb. 14, 2020), XP051849027, 10 pages, Retrieved from the Internet: URL: htttps://ftp.3gpp.org/tsg_ran/WG2_RL2/TSGR2_109_e/Docs/R2-2000438.zip. R2-2000438 FLUSv1.docx.

* cited by examiner

| Index | Recommended Bit Rate value [kbit/s] | Index | Recommended Bit Rate value [kbit/s] |
|---|---|---|---|
| 0 | Note 1 | 32 | 700 |
| 1 | 0 | 33 | 800 |
| 2 | 8 | 34 | 900 |
| 3 | 10 | 35 | 1000 |
| 4 | 12 | 36 | 1100 |
| 5 | 16 | 37 | 1200 |
| 6 | 20 | 38 | 1300 |
| 7 | 24 | 39 | 1400 |
| 8 | 28 | 40 | 1500 |
| 9 | 32 | 41 | 1750 |
| 10 | 36 | 42 | 2000 |
| 11 | 40 | 43 | 2250 |
| 12 | 48 | 44 | 2500 |
| 13 | 56 | 45 | 2750 |
| 14 | 72 | 46 | 3000 |
| 15 | 88 | 47 | 3500 |
| 16 | 104 | 48 | 4000 |
| 17 | 120 | 49 | 4500 |
| 18 | 140 | 50 | 5000 |
| 19 | 160 | 51 | 5500 |
| 20 | 180 | 52 | 6000 |
| 21 | 200 | 53 | 6500 |
| 22 | 220 | 54 | 7000 |
| 23 | 240 | 55 | 7500 |
| 24 | 260 | 56 | 8000 |
| 25 | 280 | 57 | ReservedValue1 e.g., 16,000 |
| 26 | 300 | 58 | ReservedValue2 e.g., 160,000 |
| 27 | 350 | 59 | Reserved |
| 28 | 400 | 60 | Reserved |
| 29 | 450 | 61 | Reserved |
| 30 | 500 | 62 | Reserved |
| 31 | 600 | 63 | Reserved |
| Note1: For bit rate recommendation message this index is used for indicating that no recommendation on bit rate is given. | | | |

FIG. 8A

| Index | NR Recommended Bit Rate value [Kbit/s] | Index | NR Recommended Bit Rate value [Kbit/s] |
|---|---|---|---|
| 0 | Note 1 | 32 | 700 |
| 1 | 0 | 33 | 800 |
| 2 | 9 | 34 | 900 |
| 3 | 11 | 35 | 1000 |
| 4 | 13 | 36 | 1100 |
| 5 | 17 | 37 | 1200 |
| 6 | 21 | 38 | 1300 |
| 7 | 25 | 39 | 1400 |
| 8 | 29 | 40 | 1500 |
| 9 | 32 | 41 | 1750 |
| 10 | 36 | 42 | 2000 |
| 11 | 40 | 43 | 2250 |
| 12 | 48 | 44 | 2500 |
| 13 | 55 | 45 | 2750 |
| 14 | 72 | 46 | 3000 |
| 15 | 88 | 47 | 3500 |
| 16 | 104 | 48 | 4000 |
| 17 | 120 | 49 | 4500 |
| 18 | 140 | 50 | 5000 |
| 19 | 160 | 51 | 5500 |
| 20 | 180 | 52 | 6000 |
| 21 | 200 | 53 | 6500 |
| 22 | 220 | 54 | 7000 |
| 23 | 240 | 55 | 7500 |
| 24 | 260 | 56 | 8000 |
| 25 | | 57 | ReservedVal1 e.g., 16,000 |
| 26 | 280 | 58 | ReservedVal2 e.g., 160,000 |
| 27 | 350 | 59 | Reserved |
| 28 | 400 | 60 | Reserved |
| 29 | 450 | 61 | Reserved |
| 30 | 500 | 62 | Reserved |
| 31 | 600 | 63 | Reserved |
| Note 1: For bit rate recommendation message this index is used for indicating that no new recommendation on bit rate is given. | | | |

GENERATE A QUERY MESSAGE INDICATING A REQUESTED (UPLINK OR DOWNLINK) DATA RATE FOR STREAMING SERVICES, WHEREIN THE REQUESTED (UPLINK OR DOWNLINK) DATA RATE IS INDICATED VIA A BIT RATE FIELD AND ONE OR MORE ADDITIONAL BITS

904

SEND THE QUERY MESSAGE TO A BASE STATION

| Index | NR Estimated Recommended Bit Rate Value [kbits/s] | Index | NR Estimated Recommended Bit Rate Value [kbits/s] |
|---|---|---|---|
| 0 | valueX | 32 | |
| 1 | valueY | 33 | |
| 2 | valueZ | 34 | |
| 3 | Etc. | 35 | |
| 4 | | 36 | |
| 5 | | 37 | |
| 6 | | 38 | |
| 7 | | 39 | |
| 8 | | 40 | |
| 9 | | 41 | |
| 10 | | 42 | |
| 11 | | 43 | |
| 12 | | 44 | |
| 13 | | 45 | |
| 14 | | 46 | |
| 15 | | 47 | |
| 16 | | 48 | |
| 17 | | 49 | |
| 18 | | 50 | |
| 19 | | 51 | |
| 20 | | 52 | |
| 21 | | 53 | |
| 22 | | 54 | |
| 23 | | 55 | |
| 24 | | 56 | |
| 25 | | 57 | |
| 26 | | 58 | |
| 27 | | 59 | |
| 28 | | 60 | |
| 29 | | 61 | |
| 30 | | 62 | |
| 31 | | 63 | etc. |

FIG. 14

RECOMMENDED BIT RATE AND RECOMMENDED BIT RATE QUERY FOR UPLINK AND DOWNLINK STREAMING

PRIORITY CLAIM(S)

This application claims priority to and the benefit of U.S. Provisional Application No. 62/883,612, filed on Aug. 6, 2019 and U.S. Provisional Application No. 62/910,264, filed on Oct. 3, 2019, both of which are expressly incorporated by reference in their entirety as fully set forth below and for all applicable purposes.

BACKGROUND

Field of the Disclosure

Aspects of the present disclosure relate to wireless communications, and more particularly, to techniques for enhancing streaming of uplink and downlink data.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the disclosure relate to a method for wireless communication by a user equipment (UE). The method generally includes generating a query message indicating either a requested (uplink or downlink) data rate for streaming services requiring increased data rates or a requested downlink data rate for streaming services requiring increased downlink data rates, wherein the requested increase in either the uplink or downlink data rate is indicated via a media access control (MAC) control element (CE) and sending the query message to a base station.

Certain aspects of the disclosure relate to a method for wireless communication by a network entity. The method generally includes receiving, from a user equipment (UE), a query message indicating either a requested (uplink or downlink) data rate for streaming services requiring increased data rates or a requested downlink data rate for streaming services requiring increased downlink data rates, wherein the requested increase in either the uplink or downlink data rate is indicated via a media access control (MAC) control element (CE) and processing the query message.

Certain aspects of the disclosure relate to a method for wireless communication by a user equipment (UE). The method generally includes, for streaming services, generating a query message indicating either a requested (uplink or downlink) data rate, wherein the requested (uplink or downlink) data rate is indicated via a bit rate field and one or more additional bits and sending the query message to a base station.

Certain aspects of the disclosure relate to a method for wireless communication by a network entity. The method generally includes receiving, from a user equipment (UE), for streaming services, a query message indicating a requested (uplink or downlink) data rate, wherein the requested (uplink or downlink) data rate is indicated via a bit rate field and one or more additional bits and processing the query message.

Certain aspects of the disclosure relate to a method for wireless communication by a user equipment (UE). The method generally includes generating a query message indicating either a requested data rate or a requested downlink data rate, wherein the requested uplink or downlink data rate is indicated via a media access control (MAC) control element (CE) designated for streaming services requiring increase in either the uplink or downlink data rates and sending the query message to a base station.

Certain aspects of the disclosure relate to a method for wireless communication by a network entity. The method generally includes receiving, from a user equipment (UE), a query message indicating either a requested uplink data rate or a requested downlink data rate, wherein the requested uplink or downlink data rate is indicated via a media access control (MAC) control element (CE) designated for streaming services requiring either increased uplink or downlink data rates and processing the query message.

Aspects of the present disclosure also provide various apparatuses, means, and computer readable medium corresponding to (and/or capable of performing) the operations described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 8A and 8B illustrate example bit rate tables, in accordance with certain aspects of the present disclosure.

FIG. 14 illustrates an example table with extended values for a bit rate field, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1A:
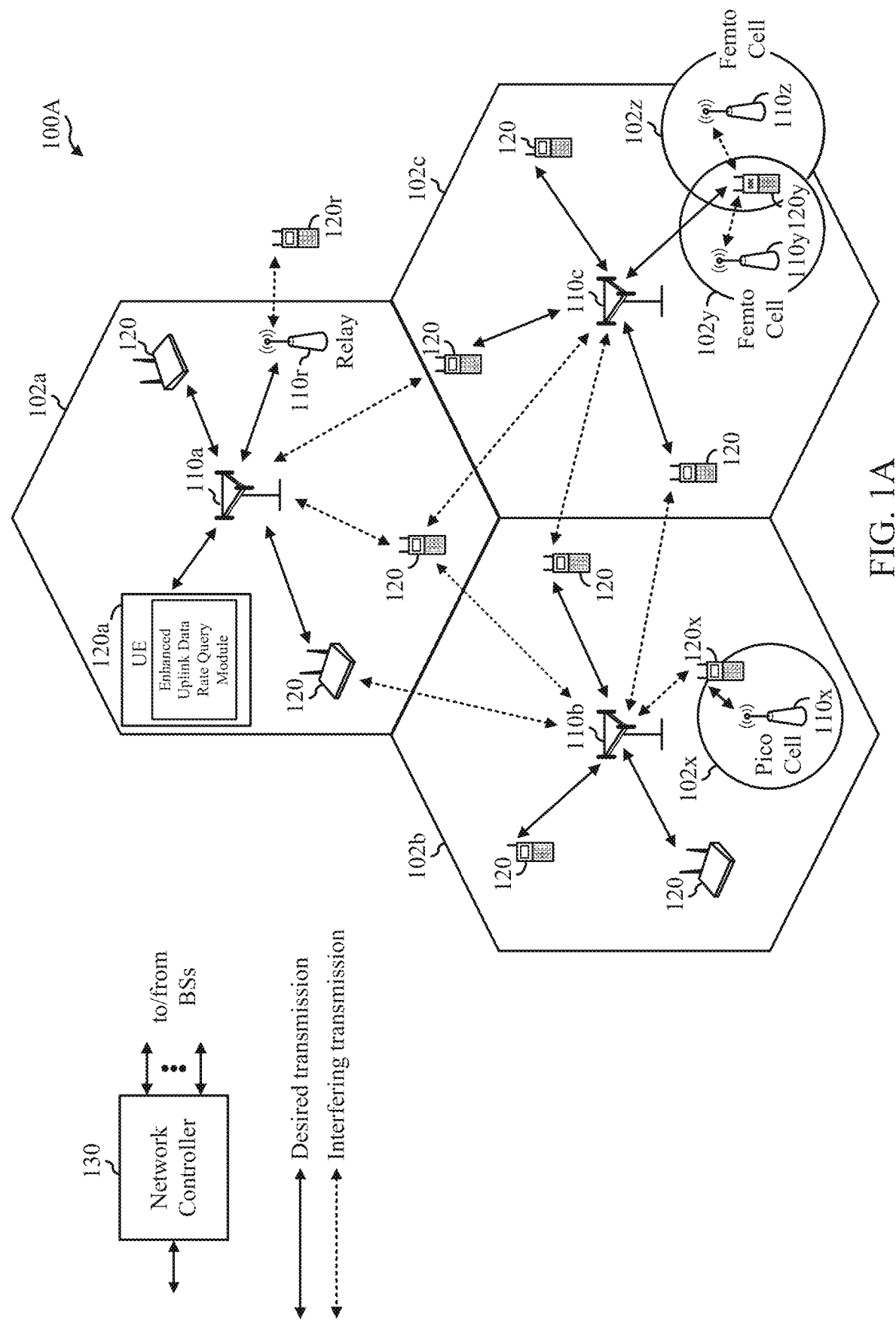
FIGS. 1A and 1B are block diagrams conceptually illustrating example telecommunications systems, in accordance with certain aspects of the present disclosure.

Aspects of the present disclosure provide apparatus, methods, processing systems, and computer readable mediums for enhanced streaming of uplink data.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

Figure 1B:
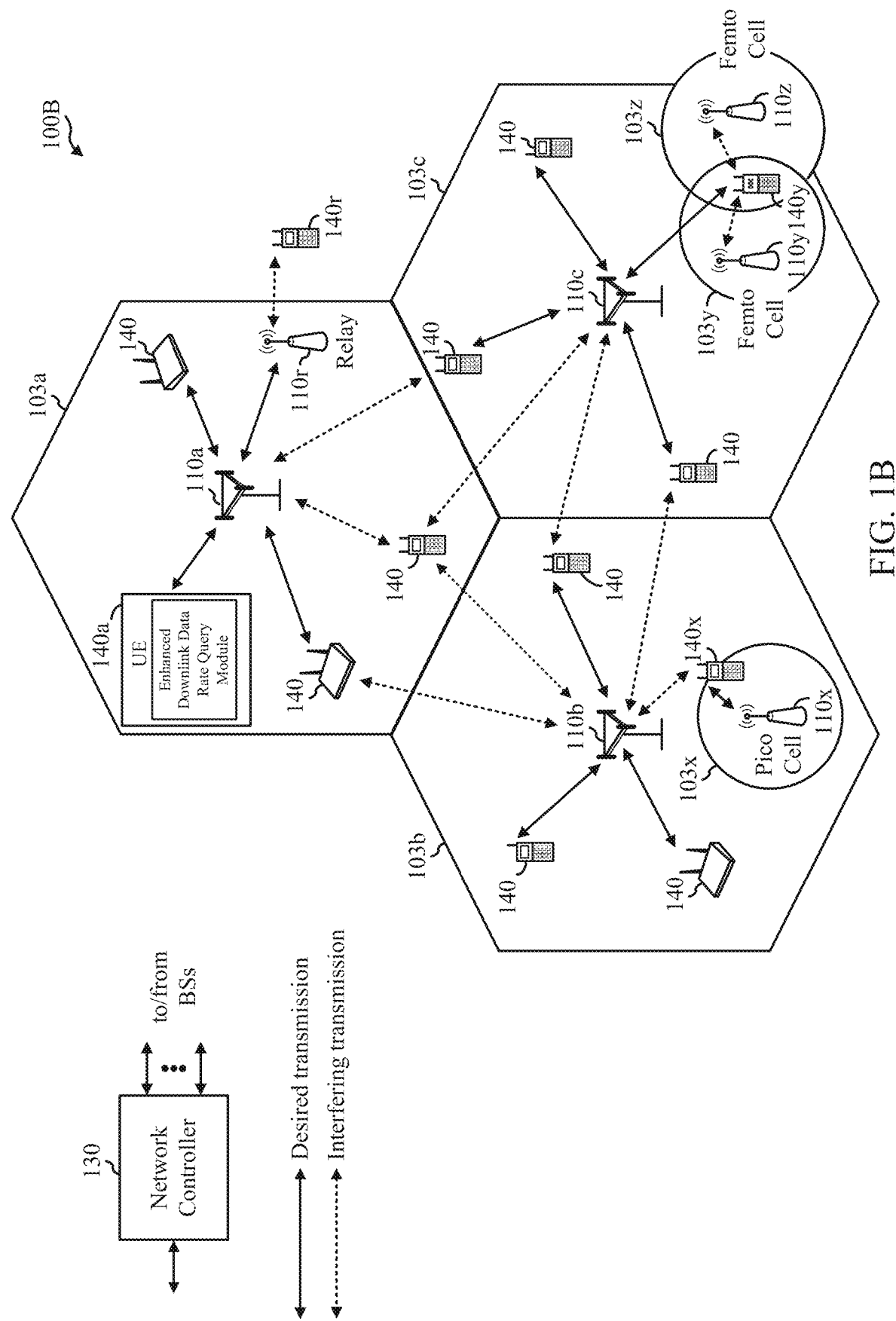

FIGS. 1A and 1B illustrate an example wireless communication network 100 in which aspects of the present disclosure may be performed.

For example, in the scenario of uplink streaming as shown in FIG. 1A, a UE 120a in the wireless communication network 100A may have a module for generation and/or transmission of an enhanced data rate query, according to one or more of various schemes presented herein. The query may be considered enhanced as it may support a requested (or recommended) bit rate significantly higher than previous supported bit rates. A base station 110 may perform complementary processing to process such a query transmitted by the UE 120a. Similarly, for example, in the scenario of downlink as shown in FIG. 1B, a UE 140a in the wireless communication network 100B may have a module for generation and/or transmission of an enhanced downlink data rate query, according to one or more of various schemes presented herein. The query may be considered enhanced as it may support a requested (or recommended) bit rate significantly higher than previous supported bit rates. A base station 110 may perform complementary processing to process such a query transmitted by the UE 140a As illustrated in FIGS. 1A and 1B, the wireless communication network 100A and 100B, respectively, may include a number of base stations (BSs) 110 and other network entities. A BS may be a station that communicates with user equipment (UE). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1A, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells. Similarly, in the example shown in FIG. 1B, the BSs 110a, 110b and 110c may be macro BSs for the macro cells 103a, 103b and 103c, respectively. The BS 110x may be a pico BS for a pico cell 103x. The BSs 110y and 110z may be femto BSs for the femto cells 103y and 103z, respectively. A BS may support one or multiple (e.g., three) cells.

Wireless communication network 100A and wireless communication network 100B may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1A, a relay station 110r may communicate with the BS 110a and a UE 120r in order to facilitate communication between the BS 110a and the UE 120r. Similarly, in the example shown in FIG. 1B, a relay station 110r may communicate with the BS 110a and a UE 140r in order to facilitate communication between the BS 110a and the UE 140r. A relay station may also be referred to as a relay BS, a relay, etc.

Wireless communication network 100A or wireless communication network 100B may be a heterogeneous network that includes BSs of different types, e.g., macro BS, pico BS, femto BS, relays, etc. These different types of BSs may have different transmit power levels, different coverage areas, and different impact on interference in the wireless communication network 100A or wireless communication network 100B. For example, macro BS may have a high transmit power level (e.g., 20 Watts) whereas pico BS, femto BS, and relays may have a lower transmit power level (e.g., 1 Watt).

Wireless communication network 100A or wireless communication network 100B may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) as shown in FIG. 1A or the UEs 140 (e.g., 140x, 140y, etc.) as shown in FIG. 1B may be dispersed throughout the wireless communication network 100A or wireless communication network 100B, respectively, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz).

Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into sub-bands. For example, a sub-band may cover 1.08 MHz (i.e., 6 resource blocks), and there may be 1, 2, 4, 8, or 16 sub-bands for system bandwidth of 1.25, 2.5, 5, 10 or 20 MHz, respectively.

Communication systems such as NR may utilize OFDM with a cyclic prefix (CP) on the uplink and downlink and include support for half-duplex operation using time division duplex (TDD). Beamforming may be supported and beam direction may be dynamically configured. MIMO transmissions with precoding may also be supported. MIMO configurations in the DL may support up to 8 transmit antennas with multi-layer DL transmissions up to 8 streams and up to 4 streams per UE. Multi-layer transmissions with up to 4 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIGS. 1A and 1B, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
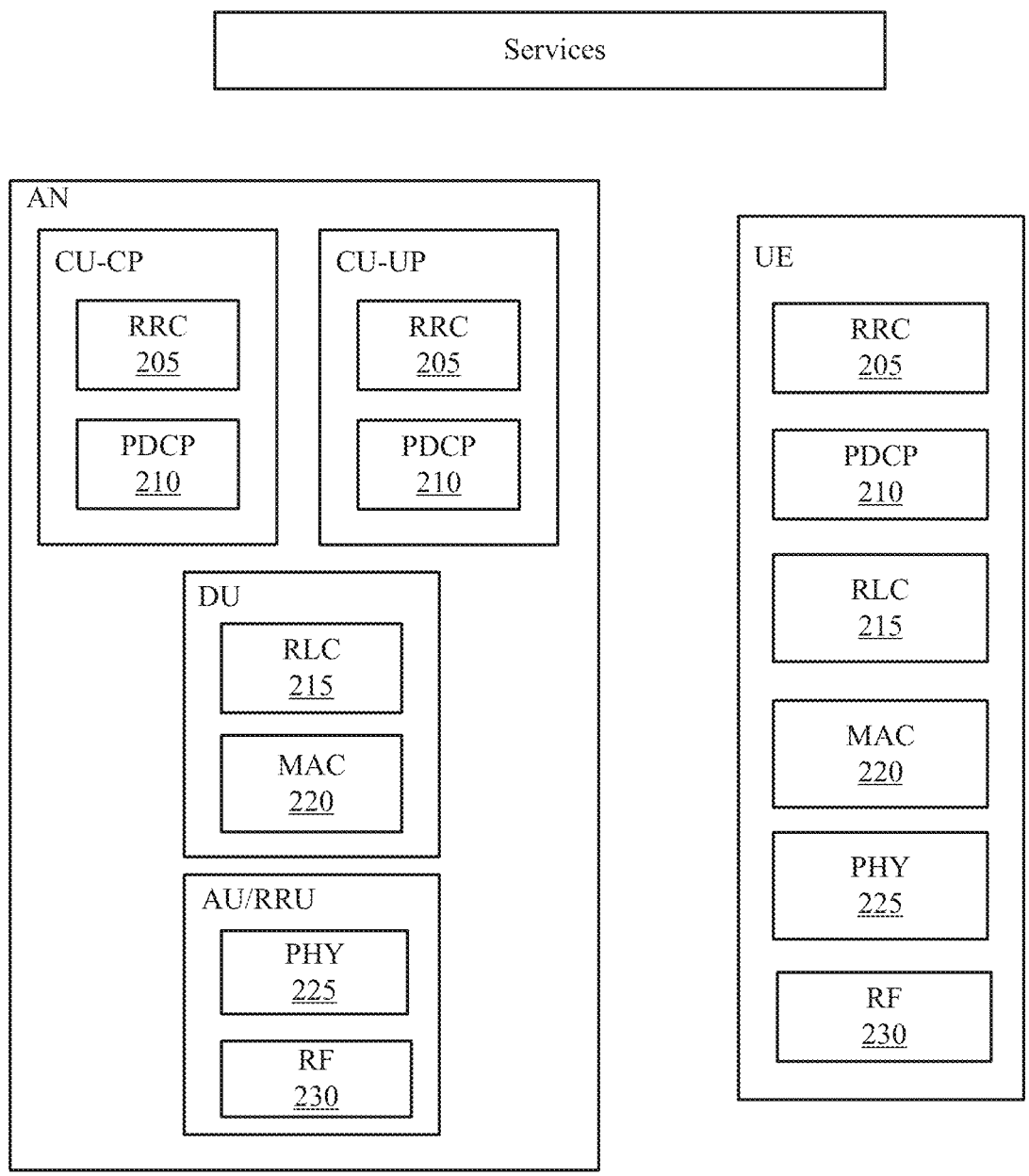
FIG. 2 is a block diagram showing examples for implementing a communication protocol stack in the example RAN architecture, in accordance with certain aspects of the present disclosure.

FIG. 2 illustrates a diagram showing examples for implementing a communications protocol stack in a RAN (e.g., such as the RAN 100), according to aspects of the present disclosure. The illustrated communications protocol stack 200 may be implemented by devices operating in a wireless communication system, such as a 5G NR system (e.g., the wireless communication network 100). In various examples, the layers of the protocol stack 200 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 2, the system may support various services over one or more protocols. One or more protocol layers of the protocol stack 200 may be implemented by the AN and/or the UE.

As shown in FIG. 2, the protocol stack 200 is split in the AN (e.g., BS 110 in FIG. 1). The RRC layer 205, PDCP layer 210, RLC layer 215, MAC layer 220, PHY layer 225, and RF layer 230 may be implemented by the AN. For example, the CU-CP may implement the RRC layer 205 and the PDCP layer 210. A DU may implement the RLC layer 215 and MAC layer 220. The AU/RRU may implement the PHY layer(s) 225 and the RF layer(s) 230. The PHY layers 225 may include a high PHY layer and a low PHY layer.

The UE may implement the entire protocol stack 200 (e.g., the RRC layer 205, the PDCP layer 210, the RLC layer 215, the MAC layer 220, the PHY layer(s) 225, and the RF layer(s) 230).

In some cases, the MAC layer 220 may support (generate and/or process) MAC-CEs as described herein (e.g., and illustrated in FIGS. 12A and 12B).

Figure 3:
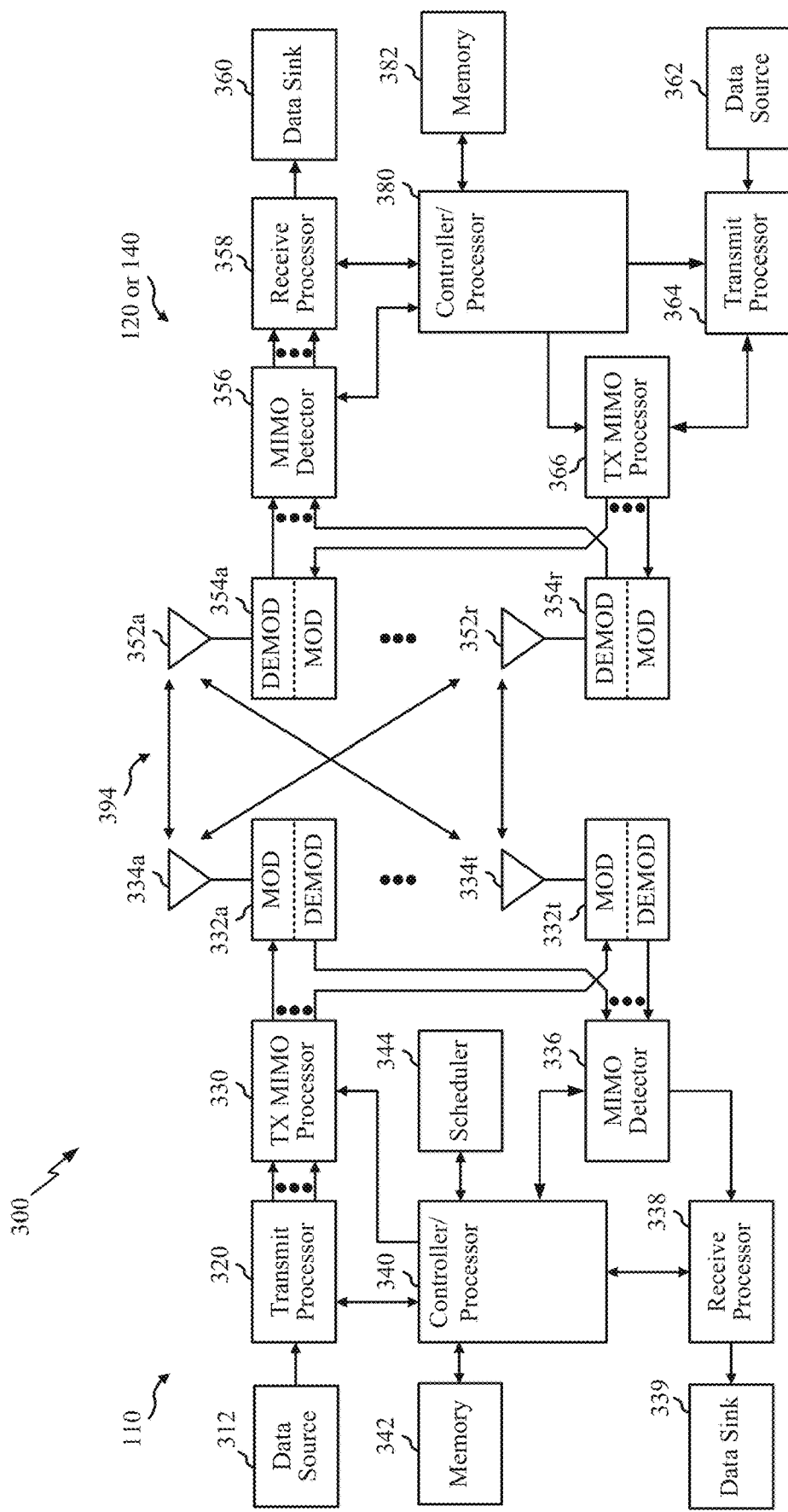
FIG. 3 is a block diagram conceptually illustrating a design of an example base station (BS) and user equipment (UE), in accordance with certain aspects of the present disclosure.

FIG. 3 illustrates example components of BS 110 and either UE 120 or UE 140 (as depicted in FIG. 1A or FIG. 1B, respectively), which may be used to implement aspects of the present disclosure. For example, antennas 352, processors 366, 358, 364, and/or controller/processor 380 of the UE 120 and/or antennas 334, processors 320, 330, 338, and/or controller/processor 340 of the BS 110 may be used to perform the various techniques and methods described herein (e.g., operations shown in FIGS. 7, 9, and 11).

At the BS 110, a transmit processor 320 may receive data from a data source 312 and control information from a controller/processor 340. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 320 may process (e.g., encode and symbol map) the data and control information to obtain data symbols and control symbols, respectively. The processor 320 may also generate reference symbols, e.g., for the primary synchronization signal (PSS), secondary synchronization signal (SSS), and cell-specific reference signal (CRS). A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120 or 140, the antennas 352a through 352r may receive the downlink signals from the base station 110 and may provide received signals to the demodulators (DEMODs) in transceivers 354a through 354r, respectively. Each demodulator 354 may condition (e.g., filter, amplify, down-convert, and digitize) a respective received signal to obtain input samples. Each demodulator may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, de-interleave, and decode) the detected symbols, provide decoded data for the UE 120 or 140 to a data sink 360, and provide decoded control information to a controller/processor 380.

In a MIMO system, a transmitter (e.g., BS 110) includes multiple transmit antennas 354a through 354r, and a receiver (e.g., UE 120 or 140) includes multiple receive antennas 352a through 352r. Thus, there are a plurality of signal paths 394 from the transmit antennas 354a through 354r to the receive antennas 352a through 352r. Each of the transmitter and the receiver may be implemented, for example, within a UE 120, a BS 110, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system is limited by the number of transmit or receive antennas, whichever is lower. In addition, the channel conditions at the UE, as well as other considerations, such as the available resources at the base station, may also affect the transmission rank. For example, the rank (and therefore, the number of transmission layers) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

On the uplink, at UE 120, a transmit processor 364 may receive and process data (e.g., for the physical uplink shared channel (PUSCH)) from a data source 362 and control information (e.g., for the physical uplink control channel (PUCCH) from the controller/processor 380. The transmit processor 364 may also generate reference symbols for a reference signal (e.g., for the sounding reference signal (SRS)). The symbols from the transmit processor 364 may be precoded by a TX MIMO processor 366 if applicable, further processed by the demodulators in transceivers 354a through 354r (e.g., for SC-FDM, etc.), and transmitted to the base station 110. At the BS 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

On the downlink, at UE 120, a receive processor 358 may receive and process data (e.g. for a PDCSH from a data source 312 of the BS). In some cases, the UE 120 (and processors thereof) may be used to process downlink data, for example, as part of a downlink streaming scenario shown in FIG. 5.

The controllers/processors 340 and 380 may direct the operation at the BS 110 and the UE 120, respectively. The processor 340 and/or other processors and modules at the BS 110 may perform or direct the execution of processes for the techniques described herein (e.g., operations shown in FIGS. 7, 9, and 11). The processor 380 and/or other processors and modules at the UE 120 may perform or direct the execution of processes for the techniques described herein (e.g., operations shown in FIGS. 6, 8, and 10). The memories 342 and 382 may store data and program codes for BS 110 and either UE 120 or UE 140, respectively. A scheduler 344 may schedule UEs for data transmission on the downlink and/or uplink.

Example Enhanced PUCCH Format

Certain aspects of the present disclosure provide techniques for supporting higher data rates, such as the higher data rates often associated with certain uplink streaming scenarios. Such data rates may far exceed the maximum supported bit rates of conventional recommended bit rate query mechanisms.

Figure 4:
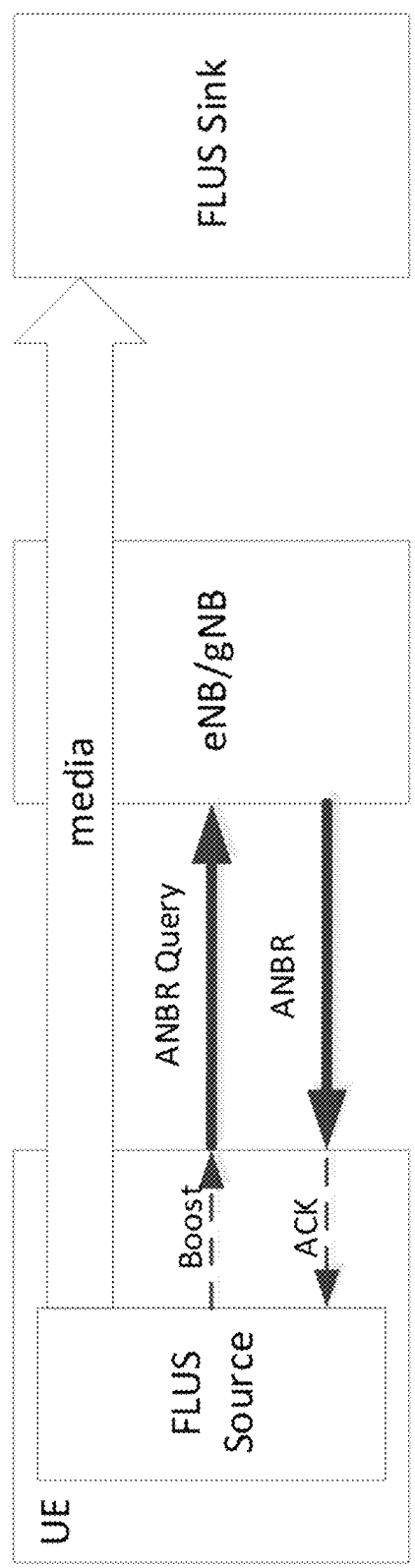
FIG. 4 illustrates an example uplink streaming scenario, in which aspects of the present disclosure may be practiced.

FIG. 4 illustrates an example scenario for uplink streaming, referred to as Framework for Live Uplink Streaming (FLUS), in which a source (e.g., a UE) streams media to a sink, for example, via a network entity (e.g., an eNB/gNB).

FLUS may include a mechanism for uplink streaming bit rate assistance using radio access network (RAN) signaling. For example, as illustrated in the example scenario of FIG. 4, the UE (acting as the FLUS Source) may interact with the RAN whereby the FLUS Source sends, and the eNB/gNB subsequently responds to, a requested boost in uplink streaming data rate.

Figure 5:
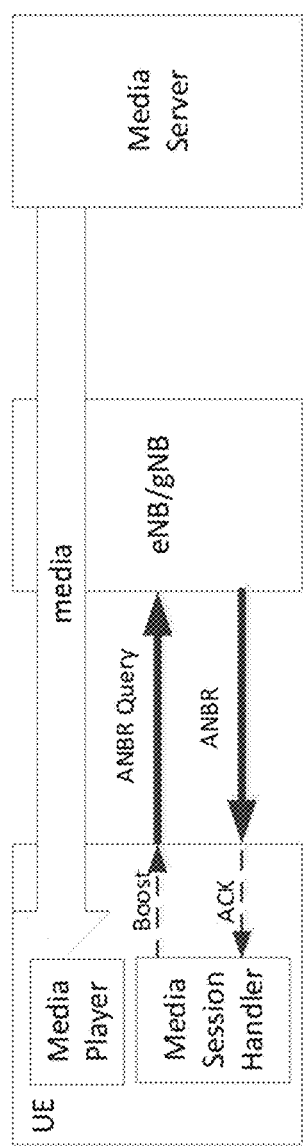
FIG. 5 illustrates an example downlink streaming scenario, in which aspects of the present disclosure may be practiced.

FIG. 5 illustrates an example scenario for downlink streaming whereby media content is downloaded from a network-based media server to, and upon request from, a UE-based media player. Such streaming media content may be delivered by an adaptive bit rate mechanism, such as Moving Picture Experts Group (MPEG) dynamic adaptive streaming over HTTP (MPEG-DASH), or MPEG common media application format (MPEG-CMAF). For example, as illustrated in FIG. 5, the UE's Media Session Handler function may interact with the RAN whereby the Media Session Handler sends, and the eNB/gNB subsequently responds to, a requested boost in downlink streaming data rate.

One possible mechanism for fulfilling the above-described functionality is referred to as an Access Network Bitrate Recommendation (ANBR) query/response messaging mechanism. ANBR generally refers to a conceptual message exchange which is mapped to actual message and/or content according to a RAT used for access. For example, in the case of long term evolution (LTE) and/or new radio (NR) access, an ANBR may be mapped to (e.g., correspond to) a "Recommended bit rate" media access control (MAC) Control Element (MAC-CE), and an ANBR Query maybe mapped to a "Recommended bit rate Query" MAC CE.

Currently-defined bit rate values for the ANBR MAC CE are limited in the corresponding bit rate that can be requested/recommend. For example, conventional ANBR MAC CEs were intended to support audio or audio/video conferencing applications and have a maximum value of 8000 kbit/s.

It is generally expected that in both uplink streaming (e.g., FLUS) or downlink streaming (e.g., of DASH or CMAF formatted media content), the targeted uplink or downlink streaming applications are expected to support significantly higher data rates associated with High Definition (HD) or Ultra HD (UHD) video streams, associated with professionally generated video content, as well as in the case of (non-professional) user generated content, and as well as support of Extended Reality applications such as virtual reality (VR). As a result, it is expected that the upper range of recommended bit rate values to be specified in the MAC CE should be much higher than the current maximum value of 8000 kbit/s.

For example, high-quality 360 degree VR and UHD-quality video streams are likely to be transmitted with a bit rate as high as 140 to 150 Mbps. Aspects of the present disclosure may support these bit rates, and even higher bit rates (e.g., up to 24 Gbps).

Aspects of the present disclosure provide solutions that may help support the higher data rates associated with various uplink streaming scenarios. In some cases, the solutions propose a query and response mechanism that may be considered enhanced relative to conventional query and response mechanisms.

Figure 6:
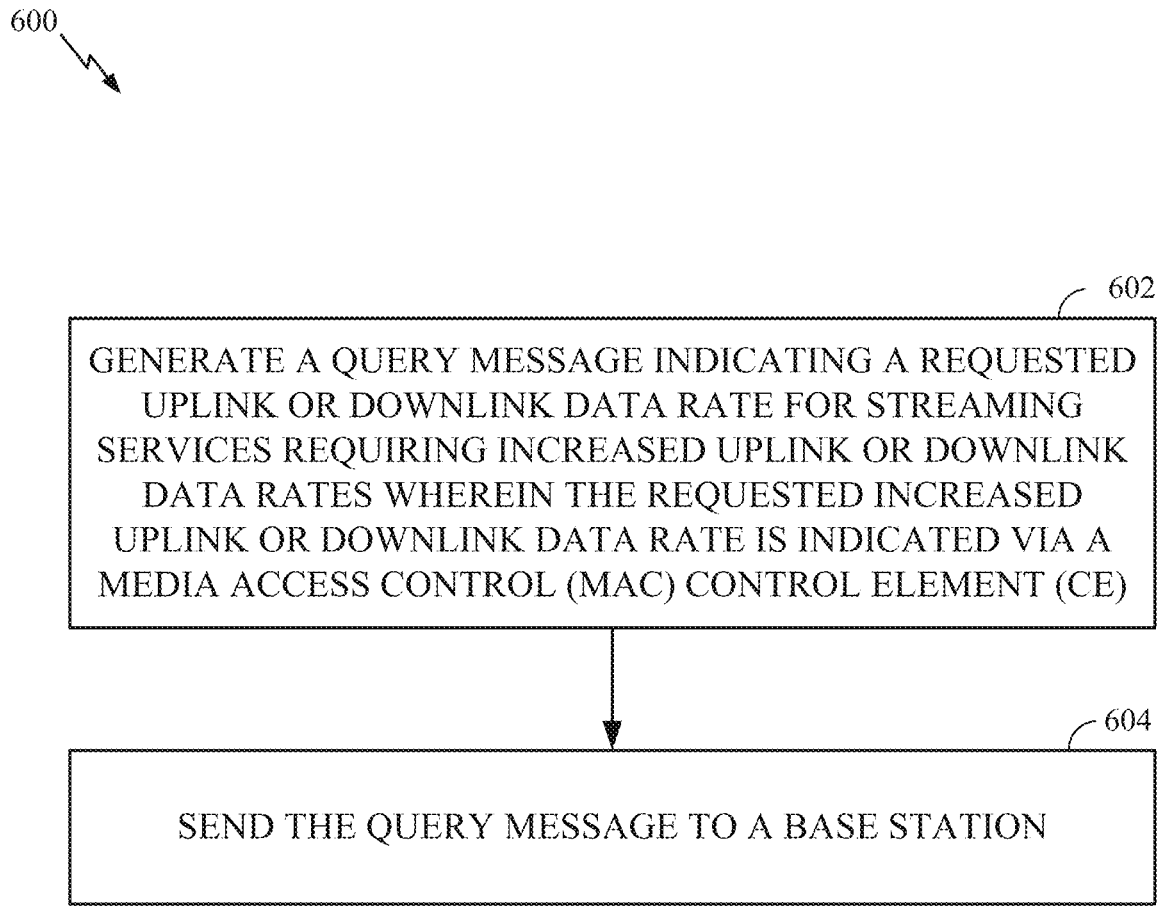
FIG. 6 illustrates example operations that may be performed by a user equipment (UE), in accordance with certain aspects of the present disclosure.

FIG. 6 illustrates example operations 600 that may be performed by the appropriate controlling entity in UE (e.g., the FLUS Source in uplink streaming, or the Media Session Handler in downlink streaming), in accordance with aspects of the present disclosure. Operations 600 may be performed, for example, by UE 120a of FIG. 1A or by UE 140a of FIG. 1B.

Operations 600 begin, at 602, by generating a query message indicating either a requested uplink or downlink data rate for streaming services requiring increased uplink or downlink data rates wherein the requested increased uplink or downlink data rate is indicated via a media access control (MAC) control element (CE). At 604, the UE sends the query message to a base station.

Figure 7:
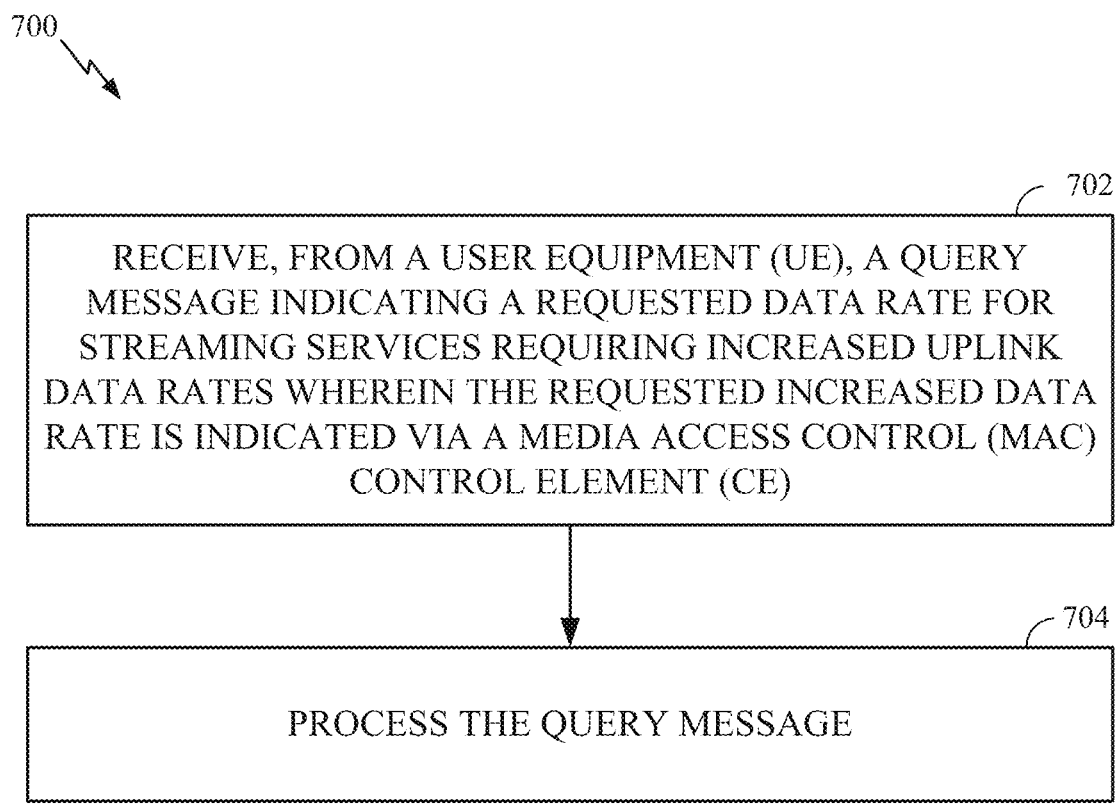
FIG. 7 illustrates example operations that may be performed by a network entity, in accordance with certain aspects of the present disclosure.

FIG. 7 illustrates example operations 700 that may be performed by a network entity (e.g., an eNB/gNB), in accordance with aspects of the present disclosure. Operations 700 may be performed, for example, by BS 110 of FIG. 1A or 1B to receive and process a query sent by a UE in accordance with operations 600.

Operations 700 begin, at 702, by receiving, from a user equipment (UE), a query message indicating a requested uplink or downlink data rate for streaming services requiring increased uplink or downlink data rates wherein the requested increased uplink or downlink data rate is indicated via a media access control (MAC) control element (CE). At 704, the network entity processes the query message.

In some cases, a UE may use one or more reserved values of an existing recommended bit rate table, such as the table shown in FIG. 8A for LTE or the table shown in FIG. 8B for NR. For example, the MAC CE in a query message may have a bit rate field that indicates one of the (previously) reserved values (e.g., 57-63 for the tables shown in FIG. 8A or FIG. 8B). While this option may be relatively straightforward to implement, in some cases, the limited number of reserved values may be insufficient to support the expected range of data rates for FLUS (at least not at a sufficient granularity). Aspects of the present disclosure, however, provide alternative options that may support the expected range of data rates at a sufficient granularity.

Figure 9:
FIG. 9 illustrates example operations that may be performed by a user equipment (UE), in accordance with certain aspects of the present disclosure.

For example, FIG. 9 illustrates example operations 900 that may be performed by an uplink streaming source (e.g., a UE 120a of FIG. 1A) or by a downlink session handler (e.g., a UE 140a of FIG. 1B), in accordance with aspects of the present disclosure.

Operations 900 begin, at 902, by generating a query message indicating a requested uplink or downlink data rate for streaming services, wherein the requested uplink or downlink data rate is indicated via a bit rate field and one or more additional bits. At 904, the UE sends the query message to a base station.

Figure 10:
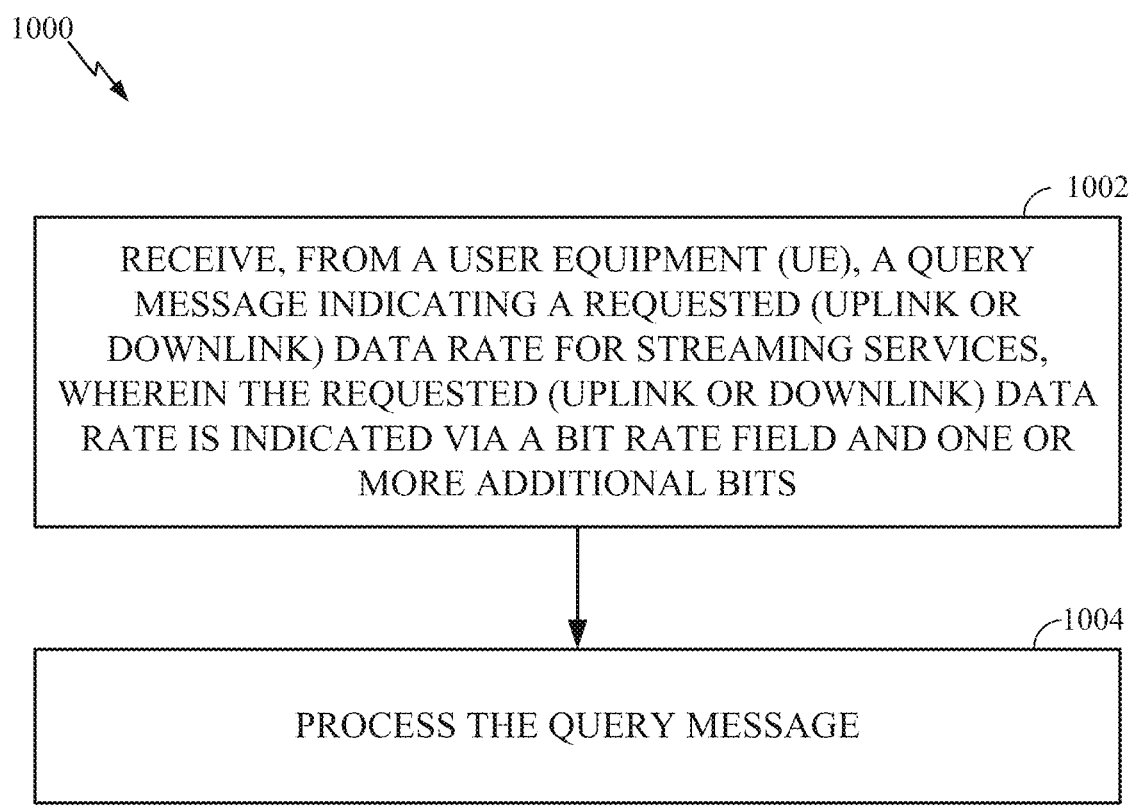
FIG. 10 illustrates example operations that may be performed by a network entity, in accordance with certain aspects of the present disclosure.

FIG. 10 illustrates example operations 1000 that may be performed by a network entity, in accordance with aspects of the present disclosure. For example, operations 1000 may be performed by an eNB/gNB to receive and process a query sent by a UE in accordance with operations 900.

Operations 1000 begin, at 1002, by receiving, from a user equipment (UE), a query message indicating a requested uplink or downlink data rate for streaming services, wherein the requested uplink or downlink data rate is indicated via a bit rate field and one or more additional bits. At 1004, the network entity processes the query message.

Figure 11A:
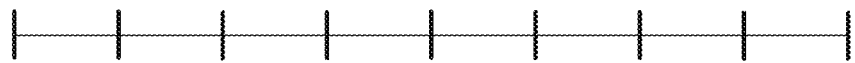
FIGS. 11A and 11B illustrate example media access control (MAC) control element (CE) formats, in accordance with certain aspects of the present disclosure.
Figure 11B:

As illustrated in the example MAC-CE formats shown in FIGS. 11A and 11B, the one or more additional bits may include reserved bits (R) in a recommended bit rate MAC CE. A single (previously reserved) bit "X" may be used to indicate that a multiplier is to be applied to a value indicated by the bit rate field in the MAC CE.

In other words, the bit rate field value may correspond to one of the values in the tables shown in FIG. 8A or 8B, and, if the multiplier bit is set, the recommended/requested bit value may be obtained by multiplying the value in the table by the corresponding multiplier. For example, assuming a multiplier of "40" if X=1, then the actual value of the "bit rate" is 40× of the value indicated by the table. Assuming a bit rate field (index) value of 2, the recommended bit rate then would be 320 kbit/s for LTE (per FIG. 8A), and 360 kbit/s for NR (per FIG. 8B).

In certain aspects, more than one bit can be used to define different "multipliers." For example, assuming a 2-bit multiplier field four values could be specified as follows:
  00→×40,
  01→×70,
  10→×100, and
  11→×200
to be applied to the indicated bit rate by a "Bit Rate" field.

With the use of "multiplier", some of the effective bit rate values that can be signaled may be effectively duplicated. For example, when the "multiplier" is ×100, setting the multiplier bit (e.g., X=1) and specifying a bit rate index of 2 has the same meaning as not setting the multiplier bit (X=0) and indicating a bit rate index of 33 in LTE. In the above example (for LTE), both settings (X=1/index=2 and X=0/index=33) may indicate 800 kbit/s. In some cases, more than one bit can be used to define different "multipliers," while also trying to avoid duplicated possible signaled values. For example, still with a 2-bit multiplier field XY where X=1 representing multiplier 515× and Y=1 representing 73×, both X and Y could be summed up if both bits are set (X=1 and Y=1, such that XY=11). In other words, the values of XY represent the following multiplier values:
  01→73×,
  10→515×,
  11→588×
to be applied to the indicated bit rate by a "Bit Rate" field.

In some cases, the multiplier(s) could be predefined in a standard specification.

In some cases, the multiplier(s) could be signaled/configured by upper layers (e.g., via RRC signaling indicating the bit rate multiplier, e.g. ×40, ×70, ×100, ×200 etc.), which may provide additional flexibility and ability to adapt to particular needs. When not configured explicitly, the multiplier can be interpreted to have a default value. This multiplier may be configured per bearer or per UE, based on a type of UE Service. If configured per bearer, then it may be applicable to one PDU session and can be part of one slice. If configured per UE, it may be part of all the PDU sessions across all slices.

In some cases, the network may configure the multiplier to be used with MAC CE formats without any change in the R bits. For example, if the multiplier is configured in this manner, the MAC CE format may be unchanged, but the interpretation of the value is updated accordingly, as described in the paragraphs above.

In some cases, the presence of a configuration (of the multiplier) can be an indication that the network supports this feature.

In some cases, a reserved bit may be used to indicate bit rate values from an extended table (e.g., extended relative to the tables shown in FIGS. 8A and 8B). In some cases, one or more of the reserved bits (R) in the recommended bit rate MAC CE may be used to define additional bits for a "bit rate" index and extend the tables shown in FIGS. 8A and 8B.

For example, if this extension bit X=1, then the bit rate index may be interpreted as 64 plus an index value indicated by the 6 bit "bit rate" field. This may effectively extend the bit rate field to 7 bits with the bit rate field value indicating the lower 6 bits of the 7 bit value. Thus, new values may be defined for indices 57 to 127, for example, and with finer granularity.

In certain aspects, more than one bit can be used to effectively extend the "bit rate" field. For example, with a 2-bit extension field, the index can be extended to as large as 255 (e.g., effectively allowing new values to be defined for indices 57 to 255).

In some cases, for backward compatibility, the extension (X) bit(s) should be considered as MSBs, not LSBs. In other words, devices that only recognize the conventional bit field may still interpret the value properly.

Still, another option to accommodate increased (i.e., a wider range of) data rates is to define a new MAC CE, specifically for the purpose of uplink streaming (e.g., FLUS).

Figure 12:
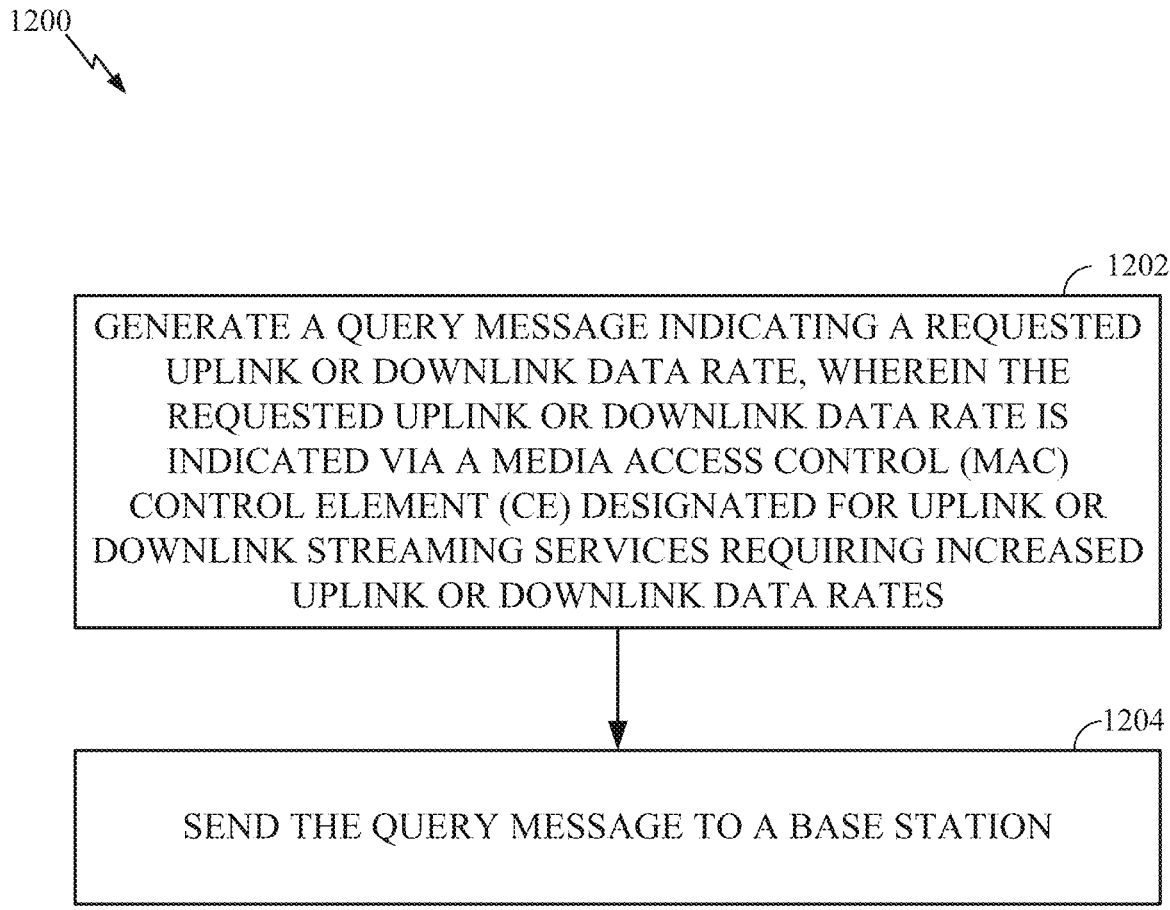
FIG. 12 illustrates example operations that may be performed by a user equipment (UE), in accordance with certain aspects of the present disclosure.

FIG. 12 illustrates example operations 1200 that may be performed by an uplink streaming source (e.g., a UE 120a of FIG. 1A or UW 140a of FIG. 1B) using a new MAC-CE, in accordance with aspects of the present disclosure.

Operations 1200 begin, at 1202, by generating a query message indicating a requested uplink or downlink data rate, wherein the requested uplink or downlink data rate is indicated via a media access control (MAC) control element (CE) designated for uplink or downlink streaming services requiring increased uplink or downlink data rates. At 1204, the UE sends the query message to a base station.

Figure 13:
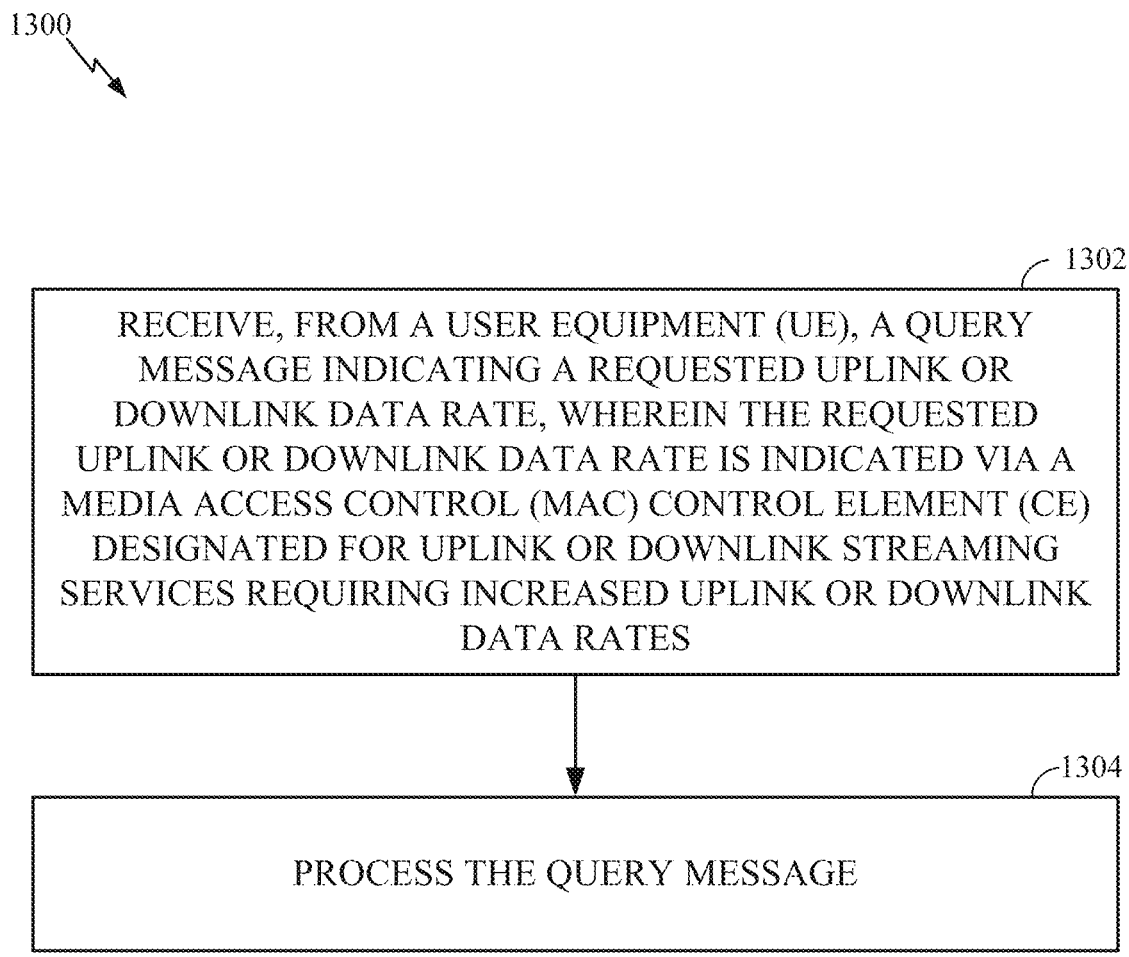
FIG. 13 illustrates example operations that may be performed by a network entity, in accordance with certain aspects of the present disclosure.

FIG. 13 illustrates example operations 1300 that may be performed by a network entity, in accordance with aspects of the present disclosure. For example, operations 1300 may be performed by an eNB/gNB to receive and process a query sent by a UE in accordance with operations 1200.

Operations 1300 begin at 1302, by receiving, from a user equipment (UE), a query message indicating a requested uplink or downlink data rate, wherein the requested uplink or downlink data rate is indicated via a media access control (MAC) control element (CE) designated for uplink or downlink streaming services requiring increased uplink or downlink data rates. At 1304, the network entity processes the query message.

In some cases, a new MAC CE (e.g., specifically for the purpose of uplink streaming such as FLUS, or downlink streaming such as MPEG-DASH), may have a similar format to the Recommended Bit Rate MAC CE. In some examples, a bit rate value in the new MAC CE may provide an index to a table with FLUS specific values in the "bit rate" table.

In some cases, a new Logical Channel Identifier (LCID) may be defined to indicate this new type of MAC CE. In such cases, an extended LCID (eLCID), may be used.

In some cases, one of the reserved bits (R) in the recommended bit rate MAC CE (shown as "X" in the example LTE and NR MAC CE formats shown in FIGS. 11A and 11B) may be used to point to new extended bit rate tables (e.g., new bit rate tables in TS 36.321 Table 6.1.3.13-x for LTE and TS 38.321 Table 6.1.3.20-x for NR). FIG. 14 illustrates an example of such a table.

For example, if X=1, then the bit rate index corresponds to the new table. This approach may allow new values to be defined in the new table with finer granularity. As the expected range of data rate to be covered is relatively large, fine granularity can be achieved with this option. If X=0, the bit rate index may correspond to a previously existing table.

In some cases, a different MAC CE may be used for each logical channel (LC). In such cases, multiple Bitrate Query MAC CEs are possible in one MAC transport block (TB) for different LCs. With an enhanced MAC CE, using one of the R-bit, a Single MAC CE can carry multiple LC related "Bit Rate Queries." In such cases, the R-bit may indicate, whether the next Byte is an LC related Bit Rate Query or if this is the last Bit Rate Query.

In some cases, to preserve backward compatibility and interoperability (e.g., if the UE supports a newer version of a standard relative to a version supported by a network, or vice-versa), the UE can indicate its capability to support the new feature (i.e., support of extended bit rates in MAC CE) to the network e.g. using a UE capability signaling. Similarly, in some case, the network may indicate capability of (its support of) the new query and response mechanism.

The network may indicate its support of the extended bit rates in MAC CE by broadcast signaling such as system information block (SIB) broadcast. As an alternative, the network may use dedicated signaling to indicate the network capability. Similar to the use of a reserved bit described above, new tables may be defined for indicating extended data rates for LTE and/or NR.

In such cases, the presence of a configuration from the network may indicate that the new table is to be used, instead of (a previously) existing table. In some cases, the network may use dedicated signaling to configure use of extended bit rate MAC CE (e.g., as shown in FIGS. 11A and 11B) for the UEs supporting extended bit rate MAC CE. In some cases, the configuration may be part of a MAC configuration (e.g., extendedBitRateMAC-CE=True). If such a flag is configured, the extended bitrate MAC CE table (e.g., as shown in FIG. 14) may be used instead of (previously) existing tables. Such a flag may also implicitly serve as the indication that the network is able to support the new table (e.g., the extended bit rate MAC CE).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. For example, the various processor shown in FIG. 3 may be configured to perform operations 600, 700, 900, 1000, 1200, and 1300 of FIGS. 6, 7, 9, 10, 12, and 13.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 or 140 (see FIG. 1A or 1B, respectively), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein (e.g., instructions for performing the operations described herein and illustrated in FIGS. 6, 7, 9, 10, 12, and 13).

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a wireless device, comprising:
   generating a query message indicating a requested data rate, wherein the requested data rate is indicated via a bit rate field and one or more additional bits indicating that a multiplier is to be applied to a bit rate value corresponding to a value of the bit rate field; and
   sending the query message to a base station.

2. The method of claim 1, wherein the requested data rate comprises a requested uplink data rate or a requested downlink data rate.

3. The method of claim 1, further comprising:
receiving a response message, from the base station, in response to the query message based at least in part to the requested data rate in the query message; and
streaming uplink data based at least in part on the response from the base station.

4. The method of claim 1, further comprising providing an indication that the wireless device supports extended bit rates query and response mechanism.

5. The method of claim 1, further comprising receiving an indication that the base station supports extended bit rates query and response mechanism.

6. The method of claim 1, wherein the requested data rate is indicated via a media access control (MAC) control element (CE) that includes the bit rate field and the one or more additional bits.

7. The method of claim 6, further comprising:
receiving signaling, from the base station, configuring the wireless device to use the MAC CE that includes the bit rate field and the one or more additional bits; and
determining a network supports an extended bit rate based on the signaling.

8. The method of claim 1, wherein:
the value of the bit rate field corresponds to a bit rate value in a bit rate table.

9. The method of claim 8, wherein the multiplier to be applied is indicated by the base station.

10. The method of claim 9, wherein a default value is used for the multiplier if a value of the multiplier is not indicated by the base station.

11. The method of claim 9, wherein at least one of:
the indication by the base station is provided using dedicated RRC signaling; or
the multiplier is configured per bearer or per user equipment.

12. The method of claim 11, wherein:
if the multiplier is configured per bearer, the multiplier is applicable to one PDU session and part of one slice; and
if the multiplier is configured per UE, the multiplier is part of PDU sessions across slices.

13. The method of claim 9, wherein configuration of the multiplier indicates that a network supports applying a multiplier to the requested bit rate value.

14. The method of claim 9, further comprising receiving signaling from the base station indicating different multiplier values corresponding to different combinations of the additional bits, wherein the indication by the base station is provided via at least one of dedicated RRC signaling or broadcast System Information Blocks signaling.

15. The method of claim 1, wherein the one or more additional bits indicate whether the bit rate field corresponds to a value in a first bit rate table or a second bit rate table.

16. The method of claim 1, wherein the additional bits indicate whether the bit rate field corresponds to a value in a first portion of a bit rate table or an extended portion of the bit rate table.

17. The method of claim 16, wherein:
the additional bits comprise at least two bits corresponding to multiple extended portions of the bit rate table; or
the additional bits correspond to most significant bits (MSBs) of an extended bit rate field value wherein the bit rate field corresponds to a value in a first portion of a bit rate table or an extended portion of the bit rate table.

18. The method of claim 1, wherein the requested data rate is selected from a table that includes bit-rates up to at least 24 Gbps.

19. A method for wireless communications by a network entity, comprising:
receiving, from a user equipment (UE), a query message indicating a requested data rate, wherein the requested data rate is indicated via a bit rate field and one or more additional bits indicating that a multiplier is to be applied to a bit rate value corresponding to the value of the bit rate field; and
processing the query message.

20. The method of claim 19, wherein the requested data rate comprises a requested uplink data rate or a requested downlink data rate.

21. The method of claim 19, further comprising:
sending a response message to the UE, in response to the query message based at least in part to the requested data rate in the query message.

22. The method of claim 19, wherein the requested data rate requested by the UE is indicated via a media access control (MAC) control element (CE) that includes the bit rate field and the one or more additional bits.

23. The method of claim 19, wherein:
the value of the bit rate field corresponds to a bit rate value in a bit rate table.

24. The method of claim 23, wherein the multiplier to be applied is indicated by the network entity.

25. The method of claim 24, wherein at least one of:
the indication by the network entity is provided using dedicated RRC signaling; or
the multiplier is configured per bearer or per UE.

26. The method of claim 24, wherein a default value is used for the multiplier if a value of the multiplier is not indicated by the network entity.

27. The method of claim 24, wherein:
if the multiplier is configured per bearer, the multiplier is applicable to one PDU session and part of one slice; and
if the multiplier is configured per UE, the multiplier is part of PDU sessions across slices.

28. The method of claim 24, wherein configuration of the multiplier indicates that the network entity supports applying a multiplier to the requested bit rate value.

29. The method of claim 24, further comprising sending signaling to the UE indicating different multiplier values corresponding to different combinations of the additional bits, wherein the indication is provided via at least one of dedicated RRC signaling or broadcast System Information Blocks signaling.

30. An apparatus for wireless communications by a wireless device, comprising:
at least one processor;
memory coupled to the at least one processor, the memory storing instructions executable by the at least one processor to cause the apparatus to generate a query message indicating a requested data rate, wherein the requested data rate is indicated via a bit rate field and one or more additional bits indicating that a multiplier is to be applied to a bit rate value corresponding to the value of the bit rate field; and
a transmitter configured to send the query message to a base station.

31. An apparatus for wireless communications by a network entity, comprising:
- a receiver configured to receive, from a user equipment (UE), a query message indicating a requested data rate, wherein the requested data rate is indicated via a bit rate field and one or more additional bits indicating that a multiplier is to be applied to a bit rate value corresponding to the value of the bit rate field;
- at least one processor; and
- memory coupled to the at least one processor, the memory storing instructions executable by the at least one processor to cause the apparatus to process the query message.

* * * * *